(12) United States Patent
Nakatsugawa et al.

(10) Patent No.: US 6,301,261 B1
(45) Date of Patent: Oct. 9, 2001

(54) COMMUNICATION METHOD AND COMMUNICATION SYSTEM

(75) Inventors: Yoshinori Nakatsugawa; Narihisa Ito, both of Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/084,742

(22) Filed: May 27, 1998

(30) Foreign Application Priority Data

May 27, 1997 (JP) .................................................. 9-137087

(51) Int. Cl.[7] .................................................. H04L 12/413
(52) U.S. Cl. .................. 370/455; 370/400; 370/406; 370/432; 370/452; 370/475; 370/410
(58) Field of Search .................... 370/258, 470, 370/471, 390, 392, 397, 399, 409, 400, 432, 452, 453, 455, 460, 404, 405, 406

(56) References Cited

U.S. PATENT DOCUMENTS

| | | | |
|---|---|---|---|
| 4,590,468 | * 5/1986 | Stieglitz | 340/825.5 |
| 4,829,516 | * 5/1989 | Orimo et al. | 370/406 |
| 5,649,108 | * 7/1997 | Spiegel | 395/200.12 |
| 5,651,003 | * 7/1997 | Pearce et al. | 370/395 |
| 6,138,165 | * 10/2000 | Nakatsugawa | 709/245 |

FOREIGN PATENT DOCUMENTS

| | | |
|---|---|---|
| 55-121762 | 9/1980 | (JP) . |
| 1-160234 | 6/1989 | (JP) . |
| 6-48817 | 6/1994 | (JP) . |

* cited by examiner

*Primary Examiner*—Huy D. Vu
*Assistant Examiner*—Thien D Tran
(74) *Attorney, Agent, or Firm*—Oblon, Spivak, McClelland, Maier & Neustadt, P.C.

(57) ABSTRACT

First, communication data are transmitted from an arbitrary originating source communication device to the other plural destination communication devices. When receiving the communication data, the respective destination communication devices which receive the communication data make responses including the receiving states of the communication data to the originating source communication device, and thereafter change a next destination of the communication data into a next address according to the description contents of a destination identifier read from the memory as next address storage means so as to transmit the communication data whose destination was changed to the communication device corresponding to the next address.

6 Claims, 4 Drawing Sheets

NUMBER OF RH

R= 1    1→2→3→4→5→6→7→8→1
R= 2    1→6→8→2→3→4→5→7→1
R= 3    1→6→7→8→1
R= 4    1→2→3→4→5→1

COMMUNICATION METHOD AND COMMUNICATION SYSTEM

BACKGROUND OF THE INVENTION

1. Field of the Invention

The present invention relates to a communication system which is arranged by connecting a plurality of communication devices through a data transmission line and exchanges data between the communication devices, more specifically, relates to a communication method and communication system in which when communication data are transmitted from an arbitrary originating source communication device to the other plural destination communication devices and the originating source communication device receives responses including receiving states of the respective destination communication devices, the originating source communication device can receive all the responses from the respective destination communication devices securely without conflict of the responses.

2. Description of the Related Art

There is known a communication system which is arranged by connecting a plurality of communication devices through a data transmission line and exchanges data between the communication devices.

The above conventional communication system is occasionally required to multiply transmit communication data suitably including various commands and control information from an arbitrary communication device to the other plural communication devices. In this case, for example, inherent multiple addresses such as "FF" are preset as for plural destination communication devices which are prescribed multiple destinations of the communication data to be transmitted in this time. The arbitrary communication device which is a transmission source adds the multiple addresses "FF" as destinations of the communication data to be transmitted in this time, and transmits the communication data to which the multiple addresses were added to the destination communication devices whose multiple addresses "FF" are set. Then, the respective destination communication devices judge as to whether or not the multiple addresses "FF" added to the communication data coincide with the self multiple addresses, and when as a result of the judgment, the multiple addresses "FF" coincide with the self multiple addresses, namely, when the respective destination communication devices are specified as the multiple addresses, a process for capturing the communication data into the respective destination communication devices is performed. Furthermore, the responses including receiving states of the respective destination communication devices are transmitted back to the originating source communication device so that when the capturing of the communication data is succeeded, acknowledgment (ACK) is transmitted back, whereas when the capturing of the communication data is failed, negative acknowledgment (NAK) is transmitted back.

However, according to the aforementioned communication method in the conventional communication system, when one originating source communication device receives responses including receiving states of plural destination communication devices, if the respective responses are overlapped at the same time, it is difficult that the originating source communication device receives all the responses from the destination communication devices securely due to conflict of the responses. Namely, this method has such a problem which should be solved.

SUMMARY OF THE INVENTION

It is an object of the present invention to provide a communication method and communication system in which when communication data are transmitted from an arbitrary originating source communication device to the other plural destination communication devices and the originating source communication device receives responses including receiving states of the respective destination communication devices, the originating source communication device can receive all the responses from the respective destination communication devices securely without conflict of the responses.

In order to solve the above problems, from a first aspect of the present invention, there is provided a communication method used in a communication system arranged by connecting a plurality of communication devices through a data transmission line, the method of transmitting communication data from an arbitrary originating source communication device to the other plural destination communication devices, the method comprising the steps of: including in the communication data at least destinations of the communication data, an originating source of the communication data and a destination identifier used for identifying next destinations of the communication data when the communication data circulate in the plural destination communication devices; providing the respective communication devices with next address storage means for previously storing next addresses representing next destinations of the communication data according to description contents of the destination identifier therein; transmitting the communication data from the originating source communication device to one of the plural destination communication devices; making responses including transmitting states of the communication data from the respective destination communication devices to the originating source communication device when the respective destination communication devices receives the communication data; changing the next destination of the communication data into a next address read from the next address storage means according to the description contents of the destination identifier; and transmitting the communication data whose destination was changed to the communication device corresponding to the next address after making the response.

According to the first aspect of the invention, an arbitrary originating source communication device transmits the communication data to one of the other plural destination communication devices. When receiving the communication data, the respective destination communication devices which receive the transmitted communication data make responses including receiving states of the communication data to the originating source communication device, and thereafter change a next destination of the communication data into a next address according to the description contents of the destination identifier read from the next address storage means so as to transmit the communication data whose destination was changed to the communication device corresponding to the next address.

Accordingly, a next address representing a next destination of the communication data according to the description contents of the destination identifier is previously stored in the next address storage means owned by the respective communication devices, and when receiving the communication data, the respective destination communication devices make responses including the receiving states of the communication data to the originating source communication device, and thereafter, change the next destination of the communication data into the next address according to the description contents of the destination identifier read from the next address storage means so as to transmit the communication data whose destination was changed to the communication data corresponding to the next address. For this reason, when the communication data are transmitted from an arbitrary originating source communication device to the other plural destination communication devices and the originating source communication device receives the responses including the receiving states of the respective destination communication devices, time overlapping of the responses from the respective destination communication devices is previously prevented, and as a result, the originating source communication device can receive all the responses from the respective destination communication devices securely without conflict of the responses.

In addition, from a second aspect of the present invention, there is provided a communication method used in a communication system arranged by connecting a plurality of communication devices through a data transmission line, the- method of transmitting communication data from an arbitrary originating source communication device to the other plural destination communication devices, the method comprising the steps of: including in the communication data at least destinations of the communication data, a transmission source of the communication data, an originating source of the communication data and a destination identifier used for identifying next destinations of the communication data when the communication data circulates in the plural destination communication devices; providing the respective communication devices with next address storage means for previously storing next addresses representing next destinations of the communication data according to description contents of the destination identifier therein; transmitting the communication data from the originating source communication device to one of the plural destination communication devices; making responses including transmitting states of the communication data from the respective destination communication device to the originating source communication device and a communication device to be a transmission source of the communication data when the respective destination communication device receives the communication data; changing the next destination of the communication data into a next address read from the next address storage means according to the description contents of the destination identifier and changing the transmission source of the communication data into a self addresses of the destination communication device; and transmitting the communication data whose destination and transmission source were changed to the communication device corresponding to the next address after making the response.

According to the second aspect of the invention, an arbitrary originating source communication device transmits the communication data to one of the other plural destination communication devices. When receiving the communication data, the respective destination communication devices which receive the transmitted communication data make responses including the receiving states of the communication data to the originating source communication device and the communication device to be a transmission source of the communication data, and thereafter, change a next destination of the communication data into a next address according to the description contents of the destination identifier read from the next address storage means and change the transmission source of the communication data into a self address of the destination communication device so as to transmit the communication data whose destination and transmission source were changed to the communication device corresponding to the next address.

Accordingly, in addition to the arrangement of the first aspect of the invention, since when receiving the communication data, the respective destination communication devices make responses including the receiving states of the communication data to the communication device to be a transmission source of the communication data, the originating source communication device and the communication device to be a transmission source of the communication data can receive all the responses from the respective destination communication devices securely without conflict of the responses.

Further, from a third aspect of the present invention, the circulating order of the communication data in the plural destination communication devices is set so that the communication data are circulated to the destination communication devices whose response time is longer taking priority with referring to lengths of inherent response time required for the respective destination communication devices to receive the communication data from the originating source communication device and make the responses including the receiving states of the communication data to the originating source communication device.

According to the third aspect of the invention, the circulating order of the communication data in the plural destination communication devices is set such that after the respective destination communication devices receive the communication data from the originating source communication device, the respective destination communication devices make responses including the receiving states of the communication data to the originating source communication device, and lengths of inherent response time required for the originating source communication device to receive the responses are referred to so that the communication data are circulated with transmission to the destination communication device whose response time is longer taking priority. For this reason, when the communication data are transmitted from the originating source communication device to the plural destination communication devices, the time required for the transmission in the whole system can be reduced.

Further, from a fourth aspect of the present invention, there is provided a communication system comprising a plurality of communication devices connected through a data transmission line so that communication data are transmitted from an arbitrary originating source communication device to the other plural destination communication devices; wherein the communication data includes at least destinations of the communication data, an originating source of the communication data and a destination identifier used for identifying next destinations of the communication data when the communication data circulate in the plural destination communication devices; the respective communication devices including next address storage means for previously storing next addresses representing next destinations of the communication data according to description contents of the destination identifier therein; the originating source communication device including: originating source transmission means for transmitting the communication data to one of the plural destination communication devices; and originating source response receiving means for receiving responses including receiving states of the communication data in the respective destination communication devices; the respective destination communication devices including; communication data receiving means for receiving the communication data; response transmission means for when the communication data receiving means receives the communication data, making responses including the receiving states of the communication data to the originating source communication device; and communication data transmission means for changing a next destination of the communication data into a next address read from the next address storage means according to the description contents of the destination identifier and transmitting the communication data whose destination was changed to the communication device corresponding to the next address after the responses of the response transmission means.

According to the fourth aspect of the invention, the originating source transmission means of the originating source communication device transmits the communication data to one of the plural destination communication devices. Accordingly, the communication data receiving means of the respective destination communication devices receives the communication data. Further, when the communication data receiving means receives the communication data, the response transmission means of the respective destination communication devices makes responses including the receiving states of the communication data to the originating source communication device. Thereafter, the originating source response receiving means of the originating source communication device receives the responses including the receiving states of the communication data in the respective destination communication devices. Then, after the response transmission means transmits the responses, the communication data transmission means of the respective destination communication devices changes a next destination of the communication data into a next address according to the description contents of the destination identifier read from the next address storage means so as to transmit the communication data whose destination was changed to the communication device corresponding to the next address.

Accordingly, a next address representing a next destination of the communication data according to the description contents of the destination identifier is previously stored in the next address storage means owned by the respective communication devices, and when receiving the communication device, the respective destination communication devices make responses including the receiving states of the communication data to the originating source communication device, and thereafter change a next destination of the communication data into a next address according to the description contents of the destination identifier read from the next address storage means so as to transmit the communication data whose destination was changed to the communication device corresponding to the next address. For this reason, when the communication data are transmitted from an arbitrary originating source communication device to the other plural destination communication devices and the originating source communication device receives the responses including the receiving states of the respective destination communication devices, time overlapping of the responses from the respective destination communication devices is previously prevented, and as a result, the originating source communication device can receive all the responses from the respective destination communication devices securely without conflict of the responses.

Further, from a fifth aspect of the present invention, there is provided a communication system comprising a plurality of communication devices connected through a data transmission line so that communication data are transmitted from an arbitrary originating source communication device to the other plural destination communication devices; wherein the communication data including at least destinations and a transmission source of the communication data, an originating source of the communication data and a destination identifier used for identifying next destinations of the communication data when the communication data circulate in the plural destination communication devices; the respective communication devices including next address storage means for previously storing next addresses representing next destinations of the communication data according to description contents of the destination identifier therein; the originating source communication device including; originating source transmission means for transmitting the communication data to one of the plural destination communication devices; and originating source response receiving means for receiving responses including receiving states of the communication data in the respective destination communication devices; the respective destination communication devices including; communication data receiving means for receiving the communication data; response transmission means for when the communication data receiving means receives the communication data, making responses including the receiving states of the communication data to the originating source communication device and the communication device to be a transmission source of the communication data; destination response receiving means for receiving the responses including the receiving states of the communication data in the respective communication devices; and communication data transmission means for changing a next destination of the communication data into a next address read from the next address storage means according to the description contents of the destination identifier and changing the transmission source of the communication data into a self address of the destination communication device and transmitting the communication data whose destination and transmission source were changed to the communication device corresponding to the next address after the responses of the response transmission means.

According to the fifth aspect of the invention, the originating source transmission means of the originating source communication device transmits the communication data to one of the plural destination communication devices. Accordingly, the communication data receiving means of the respective destination communication device receives the communication data. Further, when the communication data receiving means receives the communication data, the response transmission means of the respective destination communication devices make responses including the receiving states of the communication data to the originating source communication device and the communication device to be a transmission source of the communication data. Accordingly, the originating source response receiving means of the originating source communication device receives the responses including the receiving states of the communication data from the respective destination communication devices, whereas the destination response means of the respective destination communication devices to be a transmission source of the communication data receives the responses including the receiving states of the communication data in the respective communication devices to be a destination of the communication data. Then, after the response transmission means transmits the responses, the communication data transmission means of the respective destination communication devices changes a next destination of the communication data into a next address according to the description contents of the destination identifier read from the next address storage means and changes the transmission source of the communication data into a self address of the destination communication device so as to transmit the communication data whose destination and transmission source were changed to the communication device corresponding to the next address.

Accordingly, in addition to the arrangement of the fourth aspect, when receiving the communication data, the respective destination communication devices make responses including the receiving states of the communication data also to the communication device to be a transmission source of the communication data and receive responses including the receiving states of the communication data from the respective communication devices to be a destination of the communication data. For this reason, the originating source communication device and the communication device to be a transmission source of the communication data can receive all the responses from the respective communication devices securely without conflict of the responses.

Further, from a sixth aspect of the present invention, the circulating order of the communication data in the plural destination communication devices is set so that the communication data are circulated to the destination communication devices whose response time is longer taking priority with referring to lengths of inherent response time required for the respective destination communication devices to receive the communication data from the originating source communication device and make the responses including the receiving states of the communication data to the originating source communication device.

According to the sixth aspect of the invention, the circulating order of the communication data in the plural destination communication devices is set so that after the respective destination communication devices receive the communication data from the originating source communication device, the respective destination communication devices make responses including the receiving states of the communication data to the originating source communication device, and lengths of the inherent response time required for the originating source communication device to receive the responses are referred to so that the communication data are circulated with transmission to the destination communication device whose response time is longer taking priority. For this reason, when the communication data are transmitted from one originating source communication device to the plural destination communication devices, the time required for transmission in the whole system can be reduced.

DETAILED DESCRIPTION OF THE PREFERRED EMBODIMENTS

Embodiments of the communication method and communication system of the present invention will be described in detail with reference to the accompanying drawings hereinafter.

Figure 1:
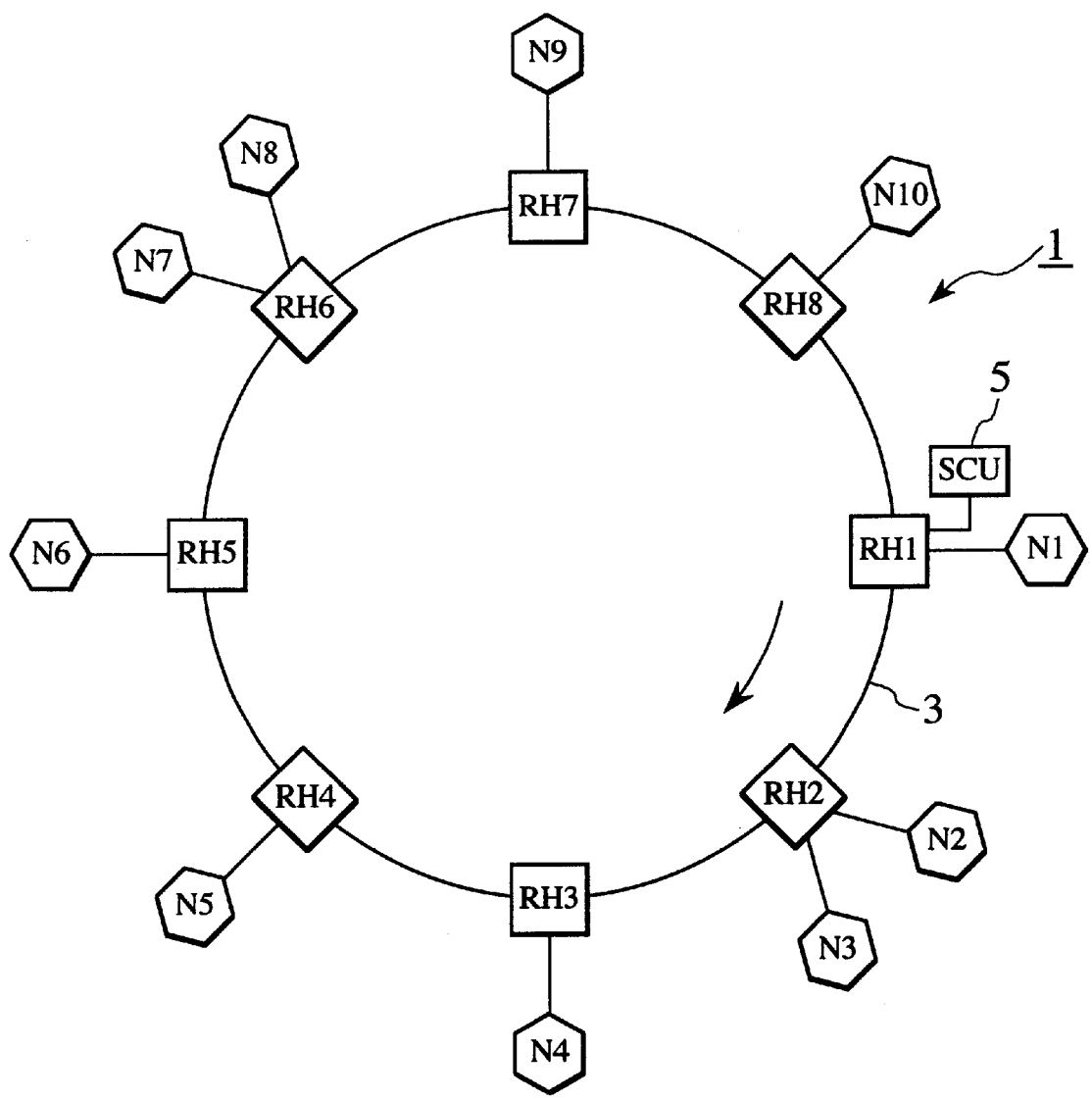
FIG. 1 is a schematic block arrangement diagram showing a communication system of the present invention.

First, as shown in FIG. 1, the communication system 1 of the present invention is arranged such that a plurality of route hubs RH1 through RH8 as communication devices are connected through a loop-shaped data transmission line 3 with data being exchangeable therebetween, and the route hub RH1 is connected with the respective rough hubs RH which makes synchronous control in the whole communication system 1 and composes the communication system 1, and a system control unit (SCU) 5 for generally controlling an address setting operation, etc. of functional equipments N. Here, as for network topology of the communication system 1, besides the above-mentioned loop form, suitable forms such as a bus form and a star form can be adopted.

The plural route hubs RH are connected respectively with not less than one or two various functional equipments N1 through N10 as node terminals to be connected, and data can be exchanged each other between the route hubs RH, between the functional equipments N and between the functional equipments N and route hubs RH through the data transmission line 3 which allows communication data to transmit to a direction of an arrow in FIG. 1, for example. As for the functional equipments N, various functional equipments can be adopted. Examples of the functional equipments are movable telephone, fax, digital TV, radio receiver, navigation unit (NV), DVD (Digital Video Disc or Digital Versatile Disc)-ROM, CD (Compact Disc)-ROM, DAT (Digital Audio Taperecorder), MD (Mini Disc), audio amplifier containing digital signal processor (DSP), CAN (Controller Area Network) interface, various sensors such as bearing sensor and car speed sensor, monitor unit and personal computer loaded in a car.

In the plural route hubs RH and functional equipments N, inherent addresses are respectively given thereto by, for example, an address setting operation in the system control unit (SCU) 5 at the time of starting up the communication system 1 so that they can be identified. In the case where data are exchanged between the route hubs RH, between the various functional equipments N and between the functional equipments N and route hubs RH through the data transmission line 3, these addresses are used for specifying a destination, transmission source or originating source. In FIG. 1, inherent addresses are set respectively to the plural route hubs RH1, RH2, RH3 . . . , RH8, whereas inherent addresses are set respectively to the plural functional equipments N1, N2, N3 . . . , N10.

Figure 2:
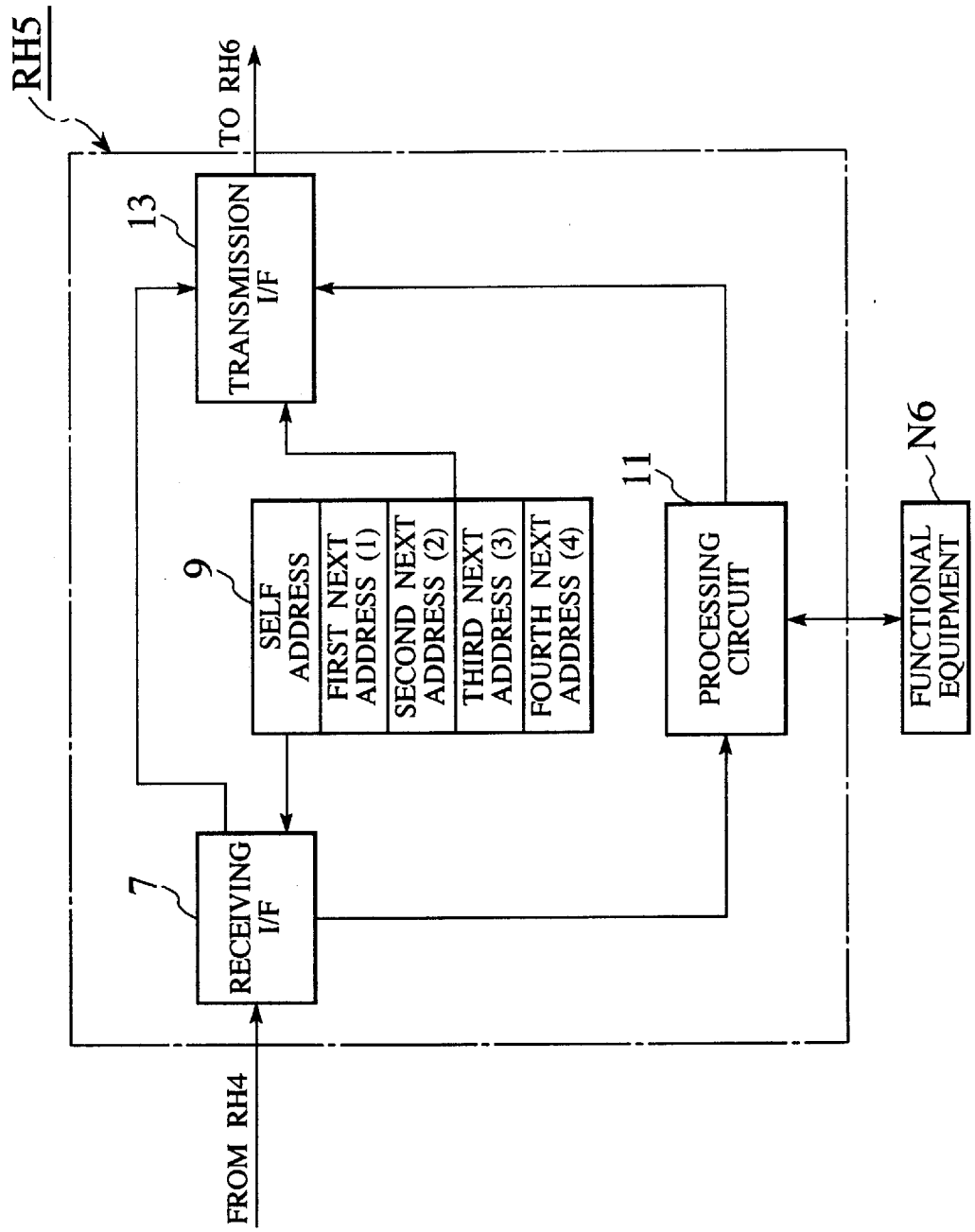
FIG. 2 is a block arrangement diagram showing a main section of the communication system of the present invention.

Next, the description is given as to the block arrangement in the route hubs RH as the communication devices by exemplifying the route hub RH5 on reference to FIG. 2. The route hub RH5 is arranged so as to have a receiving interface (hereinafter, referred to as the receiving I/F) 7, a memory 9, a processing circuit 11 and a transmission interface (hereinafter, referred to as the transmission I/F) 13. The receiving I/F 7 receives communication data sent from the route hub RH4 positioned on the upper stream side through the data transmission line 3. The memory 9 is composed of a RAM, etc. for storing an address of the route hub RH5 (hereinafter, referred to as the self address) allocated from the system control unit (SCU) 5 and storing a plurality of addresses of the route hubs RH to be next destinations of the communication data according to description contents of a destination identifier R, mentioned later, to be described in a signal frame of the communication data in the form of next addresses such as a first next address and second next address, and these addresses are allocated from the SCU 5 similarly to the self address and are referred to when the communication data are transmitted multiply. The processing circuit 11 is connected with the functional equipment N6 and gives a prescribed converting process to various data suitably including control data or source data transmitted from the functional equipment N6, or to the communication data transmitted from the receiving I/F 7. The transmitting interface 13 transmits the data converted in the processing circuit 11, data generated by the route hub RH5 or the like to the route hub RH6 positioned on the lower stream side through the data transmission line 3.

Figure 3:
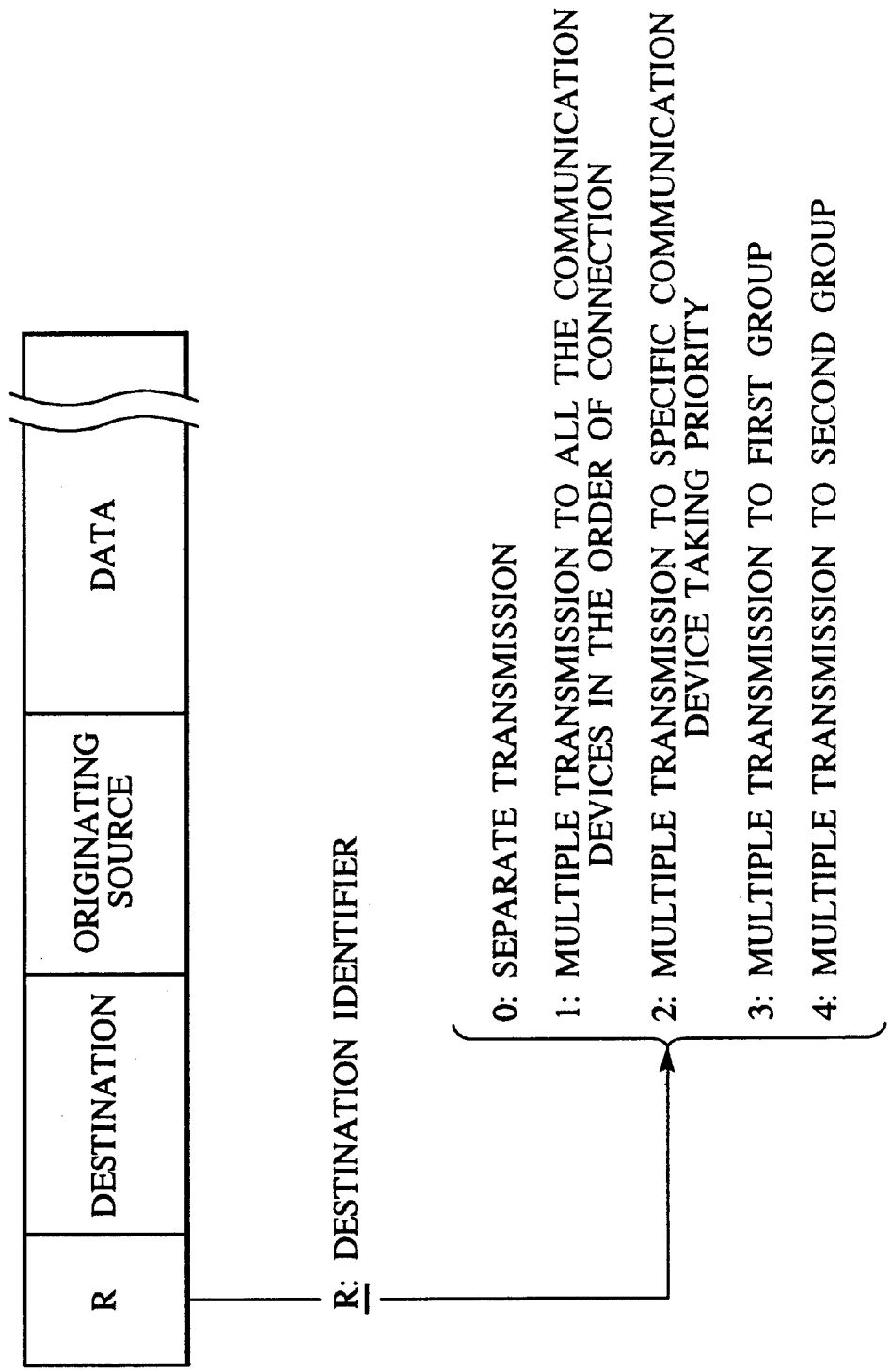
FIG. 3 is a drawing showing one example of a first data format of communication data circulating in the communication system of the present invention.

Here, the description is given as to the first data format of the communication data circulating in the communication system 1 on reference to FIG. 3. The first data format is composed of a destination identifier describing area where the destination identifier R, mentioned later is described, a destination/originating source address describing area where a destination of communication data and an address of originating source are described, and a data describing area where various commands, control information, etc. are described in the signal frame of the communication data.

The destination identifier R is used for identifying as to whether communication data to which the destination identifier R is added are transmitted to separate destinations or to multiple destinations, and when the communication data are identified as transmission to multiple destinations, the destination identifier R is used for identifying a next destination of the communication data at the time when the communication data are successively circulated within the range of the multiple destinations of the communication data in the respective route hubs RH which received the communication data to which the destination identifier R is added.

Next, the description is given as to the adding procedure of the destination identifier R to the communication data in the originating source communication device.

First, as shown in FIG. 3, for example, when the communication data are transmitted to separate destinations, R=0 is described in the destination identifier describing area in the communication data, and when the communication data are transmitted to all the route hubs RH other than the originating source communication device in the order of the connection of the route hubs RH, R=1 is described in the destination identifier describing area. When the communication data are transmitted to all the route hubs RH other than the originating source device with the transmission of the communication data to the specified route hub RH taking priority, R=2 is described in the destination identifier describing area, and when the communication data are transmitted to the route hubs RH which belong to a previously specified first group, R=3 is described in the destination identifier describing area, and when the communication data are transmitted to the route hubs RH which belong to a previously specified second group, R=4 is described in the destination identifier describing area. In order to perform the above process, destination attributes of the communication data are prescribed according to a plurality of description contents of the destination identifier R.

There exemplifies the case where the route hub RH1 is the originating source communication device of the communication data, and all the route hubs RH as the destination communication devices other than the route hub RH1 are multiple destinations of the communication data, and the communication data are successively transmitted in the clockwise direction according to the order of the connection of the respective route hubs RH within the range of the multiple destinations. In the route hub RH1 as the originating source communication device, a discrimination is made as to whether communication data are transmitted to separate or multiple destinations, and when the discrimination is made that the communication data are transmitted to the multiple destinations, the multiple destination range of the communication data and the order of circulating the communication data in the respective route hubs RH within the multiple destination range are discriminated. According to the discriminated result, the destination identifier R is described in the destination identifier describing area of the communication data.

As for the purpose to transmit the communication data with the transmission to a specific route hub RH taking priority, the description is given by exemplifying the case where the communication data are transmitted from an arbitrary originating source communication device to the other plural destination communication devices, and the originating source communication device receives responses including the respective receiving states from the plural destination communication devices. The response times of the respective destination communication devices, namely, the times required for the respective destination communication devices to receive the communication data from the originating source communication device and the originating source communication device to receive the respective responses differ due to differences of the respective data processing speeds, etc. Therefore, the purpose is because such differences are corrected. Namely, when a specific route hub RH whose response time is longer than the other is given priority in transmission of the communication data, the time required for transmission in the whole system is shorten.

Figures 4, 5:
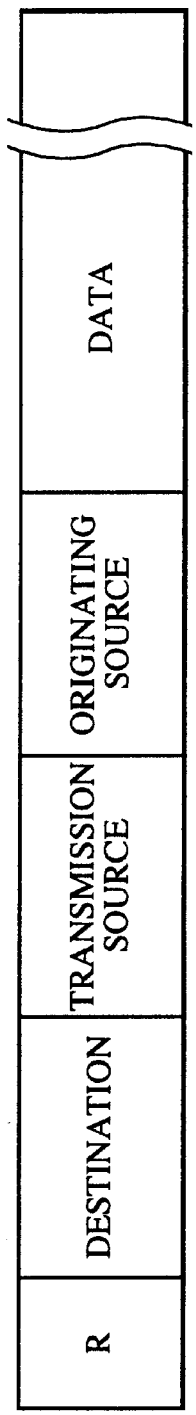
FIG. 4 is a drawing for explaining the present invention.
FIG. 5 is a drawing showing one example of a second data format of the communication data circulating in the communication system of the present invention.

Next, the description is given as to one example of the circulating routes of the communication data when the communication data to which the destination identifier R specified in the above manner is added are transmitted from the route hub RH1 as the originating source communication device to the respective route hubs RH as the destination communication devices other than the route hub RH1 on reference to FIG. 4. These routes are shown according to the description contents of the destination identifier R.

As shown in the drawing, when R=1 as the identification identifier R is described, the communication data to be transmitted from the route hub RH1 pass successively through the route hubs RH2, RH3, RH4, RH5, RH6, RH7 and RH8 in the order of the connection to return to RH1, and when R=2 as the destination identifier R is described, for example, the route hubs RH6 and RH8 whose response time is longer than the other is given priority in transmission so that the communication data pass successively through RH6, RH8, RH2, RH3, RH4, RH5 and RH7 to return to RH1. When R=3 as the destination identifier R is described, the communication data pass successively through the route hubs RH6, RH7 and RH8 which are set in the first group to return to RH1, and when R=4 as the destination identifier R is described, the communication data pass successively through RH2, RH3, RH4 and RH5 which are set in the second group to return to RH1.

Next, the description is given as to the operations of the respective route hubs RH when communication data to which "2" as the destination identifier R is described are transmitted from the route hub RH1 as the originating source communication device to all the route hubs RH as the destination communication devices other than the route hub RH1 by representatively exemplifying the route hub RH5 shown in FIG. 2.

First, as for preparation to realize the communication method of the present invention, the SCU 5 resets storage contents relating to "next address" of the memory 9 owned by the respective route hubs RH according to plural description contents of the destination identifier R. Namely, when the storage contents relating to "next address" of the memory 9 of the route hub RH5 is exemplified, an address of "RH6" as "first next address" is set correspondingly to the destination identifier R=1, an address of "RH7" as "second next address" is set correspondingly to the destination identifier R=2, "no next address" as "third next address" is set correspondingly to the destination identifier R=3, and an address of "RH1" as "fourth next address" is set correspondingly to the destination identifier R=4. As a result, the addresses of the communication devices corresponding to the next destinations according to the plural description contents of the destination identifier R are stored and set in a next address storage area of the memory 9.

In the state that the above preparation is completed, the receiving I/F 7 receives the communication data sent from the route hub RH4 positioned on the upper stream side via the data transmission line 3 and interprets destination/originating source addresses included in the received communication data and the contents of the destination identifier R. Further, the receiving I/F 7 judges as to whether or not the destination address of the communication data received this time coincides with one of the self address of the route hub RH5 and the equipment address of the functional equipment N6 connected with the route hub RH5 based on the interpreted destination/generating source addresses. As a result of the judgment, when the destination address of the communication data received this time coincides with the self address, etc. of the route hub RH5, the receiving I/F 7 identifies as to whether the communication data are transmitted to separate destinations or multiple destinations based on the interpreted description contents of the destination identifier R, whereas when both the addresses do not coincide with each other, the receiving I/F 7 sends out the communication data to the route hub RH6 positioned on the lower stream side via a by-pass route for allowing the route hub RH5 to by-pass and the transmission I/F 13.

As a result of the identification, when the destination identifier R=0, namely, when the communication data are transmitted to separate destinations, the receiving I/F 7 transmits the communication data to the corresponding destination. Moreover, when the destination identifier R≠0, namely, the communication data are transmitted to the multiple destinations, the receiving I/F 7 reads a next address which is the address of a communication device to be a next destination of the communication data corresponding to the description contents of the destination identifier R (in the present embodiment, R=2) and is preset and stored in the memory 9, and transmits the received communication data to the processing circuit 11. In this case, the communication device to be a next destination of the communication data is the route hub RH7.

Meanwhile, the processing circuit 11 captures the communication data received by the receiving I/F 7 and temporarily stores them in a buffer memory, not shown, whereas performs various processes such as a prescribed conversion on the captured communication data, and acknowledges the completion of capturing the communication data received by the receiving I/F 7 to the transmission I/F 13. Accordingly, the transmission I/F 13 transmits back to acknowledgement (ACK) representing the success in capturing the communication data, status information of the route hub RH3, etc. to the route hub RH1 as the originating source communication device, whereas after the response, changes the destination address of the communication data into the address of the route hub RH7 stored in the memory 9 as the second next address and transmits the communication data whose destination was changed to the route hub RH6 positioned on the lower stream side.

As mentioned above, according to the communication system of the present invention, next addresses to be next destinations of the communication data according to the description contents of the destination identifier R are preset and stored in the memories 9 owned respectively by the route hubs RH as the communication devices, and at the time of receiving the communication data, the responses including the receiving states of the communication data to the originating source communication device is made, and after the response, the destination addresses of the communication data are changed into one next address according to the description contents of the destination identifier R read from the memory 9 so that the communication data are transmitted to the changed next destination. For this reason, when the communication data are transmitted from an arbitrary generating source communication device to the other plural destination communication devices and the originating source communication device receives the responses including the receiving states of the destination communication devices, time overlapping of the responses from the respective destination communication devices is prevented previously, and as a result, the originating source communication device can receive all the responses from the respective destination communication devices securely without conflict of the responses.

Next, the description is given as to the second data format of the communication data circulating in the communication system 1 on reference to FIG. 5 with placing great importance on a difference with the aforementioned first data format. The second data format is arranged so that a transmission source address describing area where the latest transmission source address of the data communication is provided to the signal frame of the communication data besides the above-mentioned first data format.

The description is given as to the operation of the communication system in the case where the communication data having the second format is adopted. An arbitrary generating source communication device transmits the communication data to one communication device of the plural destination communication devices. When receiving the communication data, the respective destination communication devices which receive the transmitted communication data make the responses including the receiving states of the communication data to the originating source communication device and the communication device which is a transmission source of the communication data, and thereafter change a next destination of the communication data into a next address according to the description contents of the destination identifier R read from the memory 9, whereas change the transmission source of the communication data into a self address of the destination communication device so as to transmit the communication data whose destination and transmission source were changed to a communication device corresponding to the next address.

Therefore, according to the communication system in the case where the communication data having the second format is adopted, when receiving the communication data, the respective destination communication devices make response including the receiving states of the communication data also to the communication device to be a transmission source of the communication data, so the generating source communication device and the communication device to be a transmission source of the communication data can receive all the responses from the respective destination communication devices securely without conflict of the responses.

The present invention is not limited to the above-mentioned embodiment, so it is applicable in another embodiments which are suitably changed within the scope of the claims.

Namely, for example, the present embodiments described the example that a plurality of next addresses to be next destinations of the communication data according to the description contents of the destination identifier R are stored respectively in the memories 9 owned by the respective route hubs RH, and when the receiving of the communication data, a next destination of the communication data is changed into one next address according to the description contents of the destination identifier R read from the memory 9. However, the present invention is not limited to the above-mentioned embodiment, so for example, it is applicable in an embodiment that plural groups of multiple destination/circulating order information, which specify multiple destination groups and the circulating order of the communication data are stored in the memories 9 owned by respective route hubs RH according to the description contents of the destination identifier R, and when the receiving of the communication data, a next destination address of the communication data is specified by referring to one piece of the multiple destination/circulating order information according to the description contents of the destination identifier R and self address, and the specified next address is used as a destination of the communication data.

Finally, the present embodiment exemplifies the route hub RH1 as the originating source communication device, whereas exemplifies the other route hubs RH as the destination communication devices, but the present invention is not limited to this embodiment, so it is needless to say that when an arbitrary route hub RH is set as the generating source communication device, whereas the other plural route hubs RH are set as the destination communication devices, the communication method and communication system of the present invention can be realized.

What is claimed is:

1. A communication method used in a communication system arranged by connecting a plurality of communication devices through a data transmission line, said method of transmitting communication data from an arbitrary originating source communication device to the other plural destination communication devices, said method comprising the steps of:

including in the communication data at least destinations of the communication data, an originating source of the communication data and a destination identifier used for identifying next destinations of the communication data when the communication data circulate in the plural destination communication devices;

providing the respective communication devices with next address storage means for previously storing next addresses representing next destinations of the communication data according to description contents of the destination identifier therein;

transmitting the communication data from the originating source communication device to one of the plural destination communication devices;

making responses including transmitting states of the communication data from the respective destination communication devices to the originating source communication device when the respective destination communication devices receives the communication data;

changing the next destination of the communication data into a next address read from the next address storage means according to the description contents of the destination identifier; and transmitting the communication data whose destination was changed to the communication device corresponding to the next address after making the response.

2. A communication method used in a communication system arranged by connecting a plurality of communication devices through a data transmission line, said method of transmitting communication data from an arbitrary originating source communication device to the other plural destination communication devices, said method comprising the steps of:

including in the communication data at least destinations of the communication data, a transmission source of the communication data, an originating source of the communication data and a destination identifier used for identifying next destinations of the communication data when the communication data circulates in the plural destination communication devices;

providing the respective communication devices with next address storage means for previously storing next addresses representing next destinations of the communication data according to description contents of the destination identifier therein;

transmitting the communication data from the originating source communication device to one of the plural destination communication devices;

making responses including transmitting states of the communication data from the respective destination communication device to the originating source communication device and a communication device to be a transmission source of the communication data when the respective destination communication device receives the communication data;

changing the next destination of the communication data into a next address read from the next address storage means according to the description contents of the destination identifier and changing the transmission source of the communication data into a self addresses of the destination communication device; and transmitting the communication data whose destination and transmission source were changed to the communication device corresponding to the next address after making the response.

3. The communication method according to claim 1, wherein the circulating order of the communication data in the plural destination communication devices is set so that the communication data are circulated to the destination communication devices whose response time is longer taking priority with referring to lengths of inherent response time required for the respective destination communication devices to receive the communication data from the originating source communication device and make the responses including the receiving states of the communication data to the originating source communication device.

4. A communication system comprising a plurality of communication devices connected through a data transmission line so that communication data are transmitted from an arbitrary originating source communication device to said other plural destination communication devices; wherein said communication data includes at least destinations of said communication data, an originating source of said communication data and a destination identifier used for identifying next destinations of said communication data when said communication data circulate in said plural destination communication devices;

said respective communication devices including next address storage means for previously storing next addresses representing next destinations of said communication data according to description contents of the destination identifier therein;

said originating source communication device including:
originating source transmission means for transmitting said communication data to one of said plural destination communication devices; and
originating source response receiving means for receiving responses including receiving states of said communication data in said respective destination communication devices;
said respective destination communication devices including;
communication data receiving means for receiving said communication data;
response transmission means for when said communication data receiving means receives said communication data, making responses including said receiving states of said communication data to said originating source communication device; and
communication data transmission means for changing a next destination of said communication data into a next address read from said next address storage means according to said description contents of said destination identifier and transmitting said communication data whose destination was changed to said communication device corresponding to the next address after the responses of said response transmission means.

5. A communication system comprising a plurality of communication devices connected through a data transmission line so that communication data are transmitted from an arbitrary originating source communication device to said other plural destination communication devices; wherein
said communication data including at least destinations and a transmission source of said communication data, an originating source of said communication data and a destination identifier used for identifying next destinations of said communication data when said communication data circulate in said plural destination communication devices;
said respective communication devices including next address storage means for previously storing next addresses representing next destinations of said communication data according to description contents of said destination identifier therein;
said originating source communication device including;
originating source transmission means for transmitting said communication data to one of said plural destination communication devices; and
originating source response receiving means for receiving responses including receiving states of said communication data in said respective destination communication devices;
said respective destination communication devices including;
communication data receiving means for receiving said communication data;
response transmission means for when said communication data receiving means receives said communication data, making responses including said receiving states of said communication data to said originating source communication device and said communication device to be a transmission source of said communication data;
destination response receiving means for receiving the responses including the receiving states of said communication data in said respective communication devices; and
communication data transmission means for changing a next destination of said communication data into a next address read from said next address storage means according to the description contents of the destination identifier and changing the transmission source of said communication data into a self address of said destination communication device and transmitting said communication data whose destination and transmission source were changed to said communication device corresponding to the next address after the responses of said response transmission means.

6. The communication system according to claim 4, wherein the circulating order of the communication data in the plural destination communication devices is set so that the communication data are circulated to the destination communication devices whose response time is longer taking priority with referring to lengths of inherent response time required for the respective destination communication devices to receive the communication data from the originating source communication device and make the responses including the receiving states of the communication data to the originating source communication device.

* * * * *